US009609525B1

(12) United States Patent
Greenberger (10) Patent No.: US 9,609,525 B1
(45) Date of Patent: Mar. 28, 2017

(54) BEACON PLACEMENT SUGGESTION BASED ON TARGET REGION

(71) Applicant: International Business Machines Corporation, Armonk, NY (US)

(72) Inventor: Jeremy A. Greenberger, Raleigh, NC (US)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 15/169,492

(22) Filed: May 31, 2016

(51) Int. Cl.
| | |
|---|---|
| H04B 7/00 | (2006.01) |
| H04W 16/20 | (2009.01) |
| H04W 4/04 | (2009.01) |
| H04W 48/08 | (2009.01) |
| H04B 17/318 | (2015.01) |
| H04W 4/00 | (2009.01) |

(52) U.S. Cl.
CPC .......... *H04W 16/20* (2013.01); *H04B 17/318* (2015.01); *H04W 4/008* (2013.01); *H04W 4/043* (2013.01); *H04W 48/08* (2013.01)

(58) Field of Classification Search
USPC ...................................................... 455/41.2
See application file for complete search history.

(56) References Cited

U.S. PATENT DOCUMENTS

| 9,098,905 B2 | 8/2015 | Rivlin et al. |
| 2011/0282901 A1 | 11/2011 | Marks et al. |
| 2013/0225197 A1* | 8/2013 | McGregor ............. G01S 1/042 455/456.1 |
| 2013/0267245 A1* | 10/2013 | Shimizu ............. H04W 64/003 455/456.1 |
| 2014/0120945 A1 | 5/2014 | Sharma et al. |

OTHER PUBLICATIONS

Steczkiewicz, A., "Best practices for installing Estimote Beacons", Aug. 27, 2015, downloaded Apr. 15, 2016 from https://community.estimote.com/hc/en-us/articles/202041266-What-is-ideal-Estimote-Beacon-placement-, pp. 1-3, Estimote, Inc., United States.
Yuan, Z. et al. "A Cost-Efficiency Method on Beacon Nodes Placement for Wireless Localization", Feb. 16, 2015, pp. 546-550, 2015 International Conference on Computing, Networking and Communications (ICNC), United States.

* cited by examiner

*Primary Examiner* — Ankur Jain
(74) *Attorney, Agent, or Firm* — Sherman IP LLP; Kenneth L. Sherman; Hemavathy Perumal (57) ABSTRACT

One embodiment provides a system for suggesting placement of beacons within a venue. The system performs operations including receiving a floor plan for a venue, receiving user-specified input identifying a defined area within the floor plan to target, and determining an arrangement of beacons for providing beacon coverage for the defined area. A total number of beacons to include within the defined area is determined. For each beacon, a corresponding location within the defined area to position the beacon at is also determined. The arrangement of beacons is determined based on historical location data for the venue, user-specified preferences for the venue, signal strength of the beacons, and available power levels for the beacons.

1 Claim, 6 Drawing Sheets

BEACON PLACEMENT SUGGESTION BASED ON TARGET REGION

The present invention generally relates to systems, and more particularly, a system providing beacon placement suggestions based on target region.

BACKGROUND

Location based services utilize beacons (i.e., hardware transmitters) to enhance user experience, such as providing enhanced experiences for customers of venues such as stadiums, airports, retail stores, and hospitals. Examples of beacons include Bluetooth low energy (BLE) devices (e.g., a BLE device compatible with iBeacon protocol). Beacons may be used for a wide range of use cases from sales promotions to building security. BLE beacons transmit wireless Bluetooth signals to Bluetooth enabled devices (e.g., smart phones) for use in awareness and promotion. For example, a BLE beacon can transmit a wireless Bluetooth signal to a Bluetooth enabled device to notify an application on the device that it is within the proximity of the beacon.

SUMMARY

One embodiment provides a system for suggesting placement of beacons within a venue. The system performs operations including receiving a floor plan for a venue, receiving user-specified input identifying a defined area within the floor plan to target, and determining an arrangement of beacons for providing beacon coverage for the defined area. A total number of beacons to include within the defined area is determined. For each beacon, a corresponding location within the defined area to position the beacon at is also determined. The arrangement of beacons is determined based on historical location data for the venue, user-specified preferences for the venue, signal strength of the beacons, and available power levels for the beacons.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to systems, and more particularly, a system providing beacon placement suggestions based on target region. One embodiment provides a system for suggesting placement of beacons within a venue. The system performs operations including receiving a floor plan for a venue, receiving user-specified input identifying a defined area within the floor plan to target, and determining an arrangement of beacons for providing beacon coverage for the defined area. A total number of beacons to include within the defined area is determined. For each beacon, a corresponding location within the defined area to position the beacon at is also determined. The arrangement of beacons is determined based on historical location data for the venue, user-specified preferences for the venue, signal strength of the beacons, and available power levels for the beacons.

For expository purposes, the term "venue" as used herein generally denotes a physical space (i.e., a collection of physical coordinates) owned and/or operated by an individual or an entity (e.g., a retail company, a start-up, a law firm, etc.). The term "venue operator" as used herein generally denotes an individual or entity operating a venue. A physical space operated by a venue operator may be occupied by one or more employees of the venue operator. The term "defined area" as used herein generally denotes a logical or abstract area within a venue occupied by a particular individual (e.g., in an office context, an employee's cubicle or office) or having a particular purpose (e.g., in an office context, a particular department such as the Accounts department, a seating area, a counter, a conference room, a common kitchen area, etc.). The terms "defined area" and "target region" may be used interchangeably.

Not all beacons act or perform in the same way/manner. Further, not all infrastructures of venues allow for ideal signal performance from beacons. It may be difficult for a venue operator to arrange/place (i.e., position) beacons within a venue to get ideal signal performance from the beacons.

Embodiments of the invention provide a system configured to aggregate location and location-related metadata to build context that may be used for analysis and resulting actions. If an open beacon architecture system is in place at a venue, beacons may be installed within a defined area of the venue to cover the defined area. One embodiment provides a system configured to recognize where beacons should be arranged/placed (i.e., positioned) within an infrastructure of a venue. The system allows a user (e.g., a venue operator) to define an area within a venue to target. The system then suggests/estimates, based on historical actual data, an optimal arrangement/placement of beacons within the defined area to provide beacon coverage for the defined area.

Figure 1:
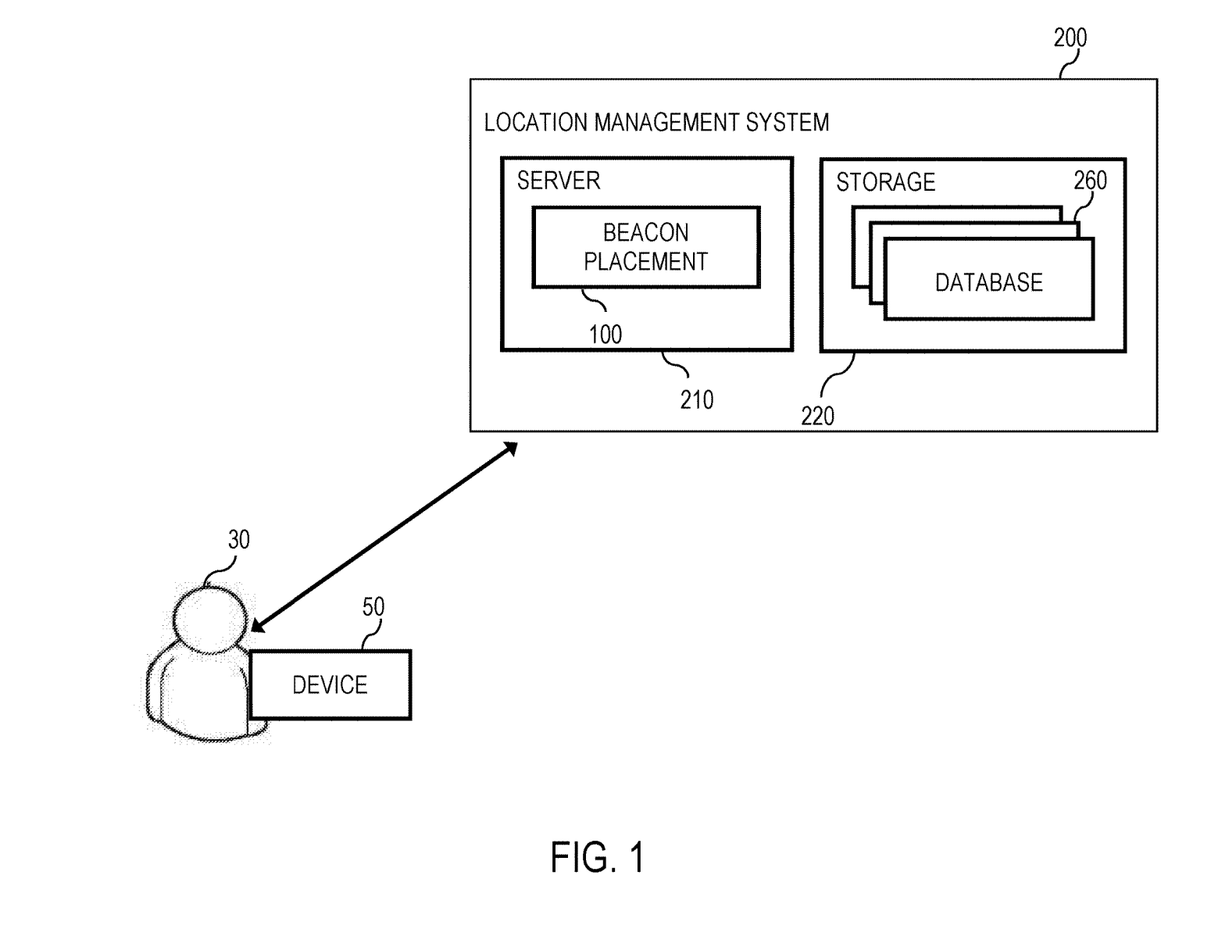
FIG. 1 illustrates an example system, in accordance with an embodiment of the invention.
Figure 4:
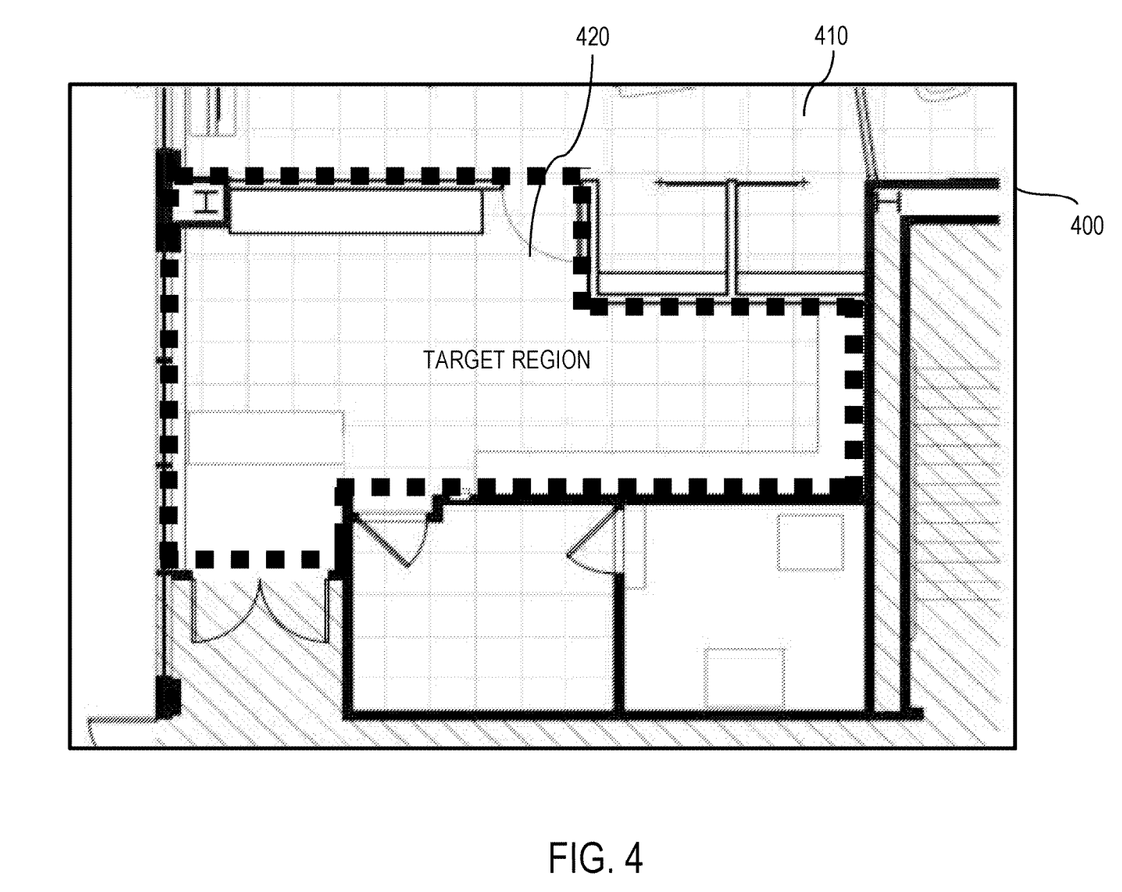
FIG. 4 illustrates an example floor plan for a venue, in accordance with an embodiment of the invention.

FIG. 1 illustrates an example system 200, in accordance with an embodiment of the invention. The system 200 comprises one or more server devices 210, and one or more storage devices 220. The storage devices 220 maintain one or more databases 260. As described in detail later herein, one or more applications may execute/operate on the server devices 210, such as a beacon placement unit 100 configured to provide beacon placement suggestions for a target region 420 (FIG. 4) of a venue 400 (FIG. 4). The system 200 may be implemented at the venue 400 itself or in a cloud computing environment.

A user 30 (e.g., a venue operator) may exchange data with the system 200 via an electronic device 50 carried by the user 30, such as a laptop computer, a tablet, a mobile smartphone, a wearable device (e.g., a smartwatch), etc. For example, a user 30 initiates a communication with the system 200 utilizing a device 50. In one embodiment, a device 50 exchanges data with the system 200 over a connection (e.g., a wireless connection, a wired connection, or a combination of the two).

As described in detail later herein, a device 50 is configured to upload/forward to the system 200 information relating to a venue 400. The information uploaded/forwarded may include, but is not limited to, at least one of the following: (1) floor plan data comprising one or more floor plans 410 (FIG. 4) for one or more floors of the venue 400, and (2) target region data identifying one or more target regions 420 defined within the floor plans 410.

Figure 2:
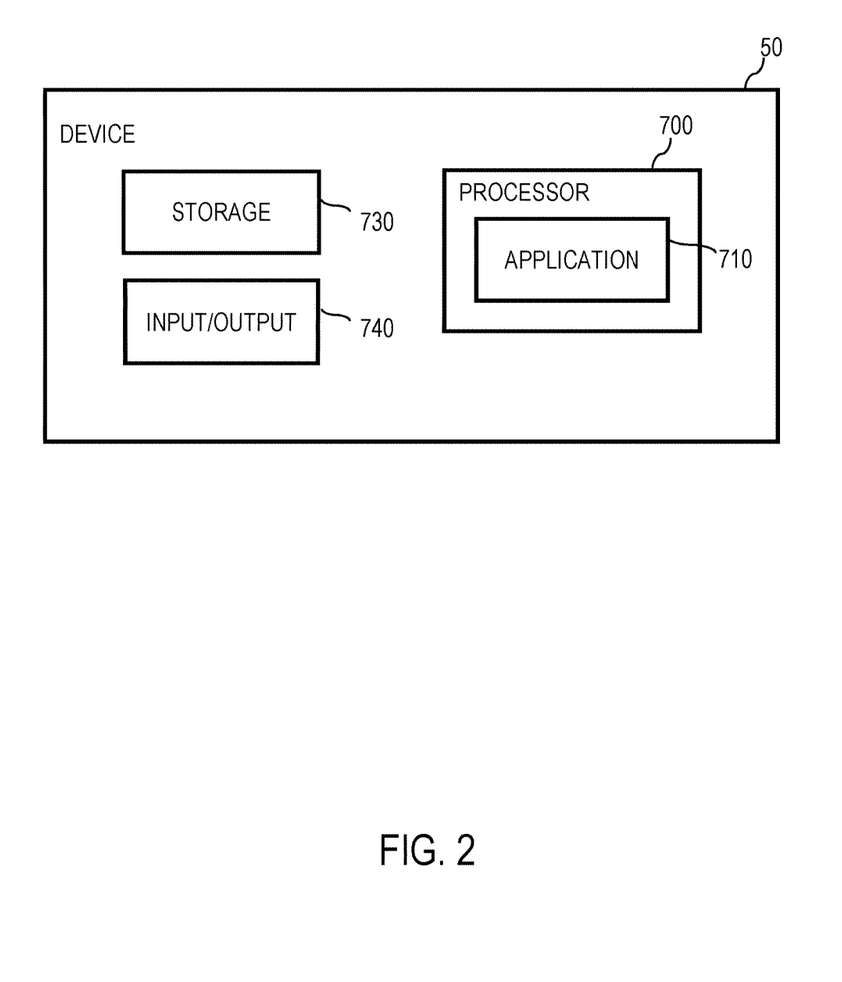
FIG. 2 illustrates an example device in detail, in accordance with an embodiment of the invention.

FIG. 2 illustrates an example device 50 in detail, in accordance with an embodiment of the invention. The device 50 comprises one or more processors 700, and one or more storage devices 730. One or more applications 710 may execute/operate on the processors 700. The applications 710 may include, but are not limited to, at least one of the following: a web browser and/or a mobile application for interfacing with and exchanging data with the system 200.

The device 50 further comprises one or more input/output (I/O) devices 740, such as a touch screen, a keyboard, a telephone keypad, a microphone, a speaker, a display screen, etc.

Figure 3:
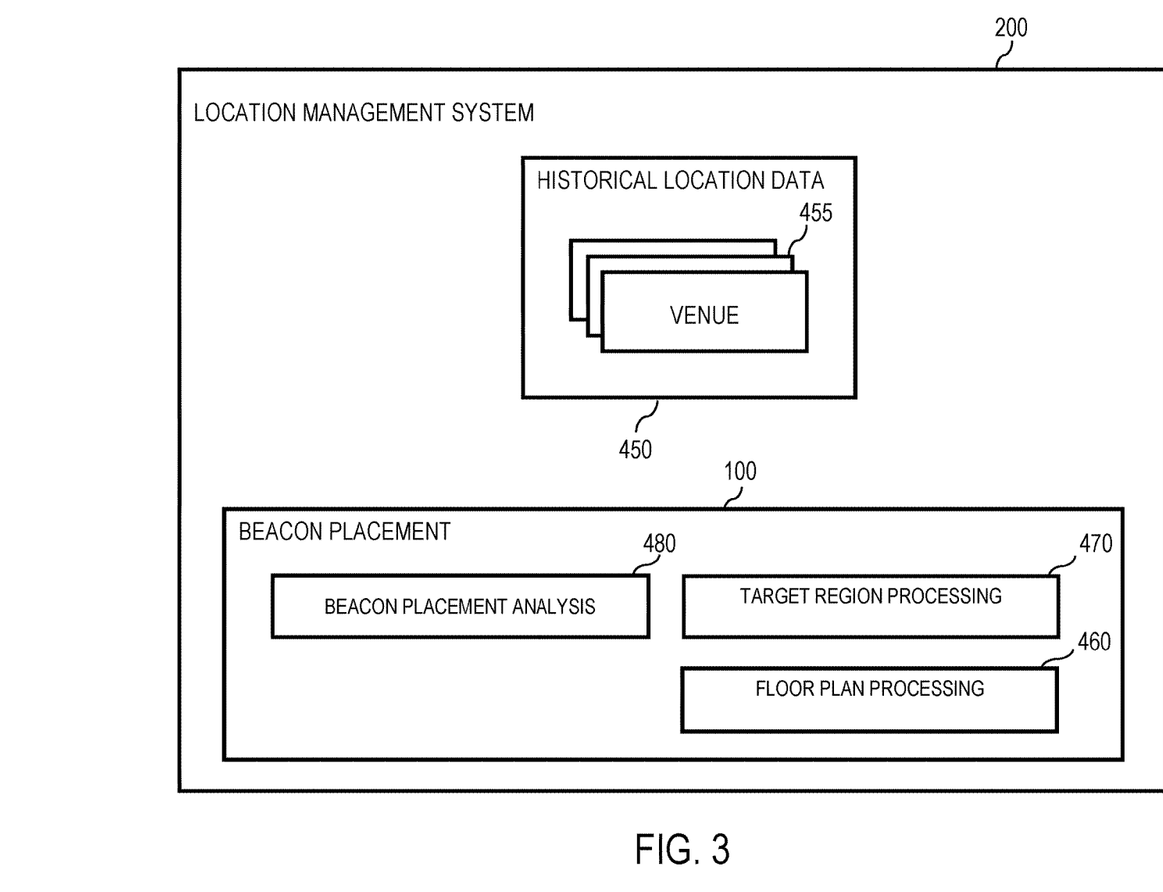
FIG. 3 illustrates the example system in detail, in accordance with an embodiment of the invention.

FIG. 3 illustrates the example system 200 in detail, in accordance with an embodiment of the invention. As stated above, the storage devices 220 may maintain one or more databases 260. For example, the storage devices 220 may include at least one database 450 including historical actual data, such as historical location data for one or more venues 400. The venues 400 may be operated by the same venue operator or different venue operators.

In one embodiment, the historical location data comprises at least one data record 455 for a venue 400. Each data record 455 for each venue 400 comprises, but is not limited to, at least one of the following types of location and location-related metadata: (1) floor plan data comprising one or more floor plans 410 (FIG. 4) for one or more floors of the venue 400, (2) beacon placement data identifying prior/previous arrangements/placements of beacons 430 (FIG. 5) for defined areas within the floor plans 410, and (3) observed beacon coverage/signal performance provided by beacons placed/positioned in accordance with the prior/previous arrangements/placements.

The beacon placement unit 100 comprises a floor plan processing unit 460 configured to receive floor plan data for a venue 400 and identify a floor plan 410 for a floor of the venue 400 based on the floor plan data received. Specifically, the floor plan processing unit 460 is configured to: (1) receive a floor plan 410 uploaded by a user 30 via a device 50, (2) receive a scale inputted by the user 30 for the floor plan 410, and (3) determine a scale ratio for the floor plan 410. The scale represents a known distance on the floor plan 410. The scale may be inputted via an I/O device 740 of the device 50. The floor plan processing unit 460 assigns a pixel value to the known distance, and divides the known distance by the assigned pixel value to obtain the scale ratio for the floor plan 410.

In one embodiment, the floor plan processing unit 460 is further configured to identify presence of one or more objects (e.g., furniture items, such as metal shelving, etc.) within the venue 400 that may disrupt/interfere with signals from beacons 430 within the venue 400. The user 30 may provide, via one or more I/O devices 740 of the device 50, object data specifying at least one object positioned within the venue 400 and its corresponding location. For example, the object data may be provided as text specifying one or more location coordinates of one or more objects within the venue 400. As another example, the object data may be provided as at least one marking/drawing defining one or more locations of one or more objects on a floor plan 410 displayed on the device 50. The floor plan processing unit 460 processes the object data received to identify one or more objects positioned within the venue 400.

The beacon placement unit 100 further comprises a target region processing unit 470 configured to define an area within the floor plan 410 as a target region 420 (FIG. 4). Specifically, target region processing unit 470 is configured to: (1) instruct the user 30 to define the target region 420 within the floor plan 410 by marking/drawing, via one or more I/O devices 740 of the device 50, the target region 420 on the floor plan 410 displayed on the device 50, and (2) receive user-provided markings/drawings defining the target region 420 from the device 50.

The beacon placement unit 100 further comprises a beacon placement analysis unit 480 configured to determine an optimal arrangement/placement of beacons to provide full beacon coverage for the target region 420. Specifically, the beacon placement analysis unit 480 is configured to: (1) determine a total number of beacons to place within the target region 420, and (2) for each beacon, determine a corresponding placement/location for the beacon within the target region 420.

In one embodiment, the beacon placement analysis unit 480 is further configured to query the user 30 and/or an external source (e.g., a website, etc.) to determine historical location data for the venue 400, preferences for the venue 400, signal strength of beacons, and/or available power levels for the beacons. For example, the beacon placement analysis unit 480 is configured to query to determine one or more of the following: (1) whether the venue operator for the venue allow for beacons to be placed where there are no walls and/or shelves, (2) the optimal power each beacon should use when transmitting a signal, (3) historical location data for an infrastructure of the target region 420, and (4) whether the target region 420 should be fully encompassed inside beacon coverage of beacons or whether the beacons should be fully encompassed inside the target region 420 instead.

In one embodiment, the beacon placement analysis unit 480 determines the optimal arrangement/placement of beacons based on at least one of the following: historical location data for the venue 400 (e.g., one or more data records 455 for the venue 400), preferences for the venue 400, signal strength of the beacons, and available power levels for the beacons.

In one embodiment, the beacon placement analysis unit 480 provides the optimal arrangement/placement of beacons as an updated floor plan 490 (FIG. 5) showing placement/location of each beacon 430 within the target region 420.

Figure 5:
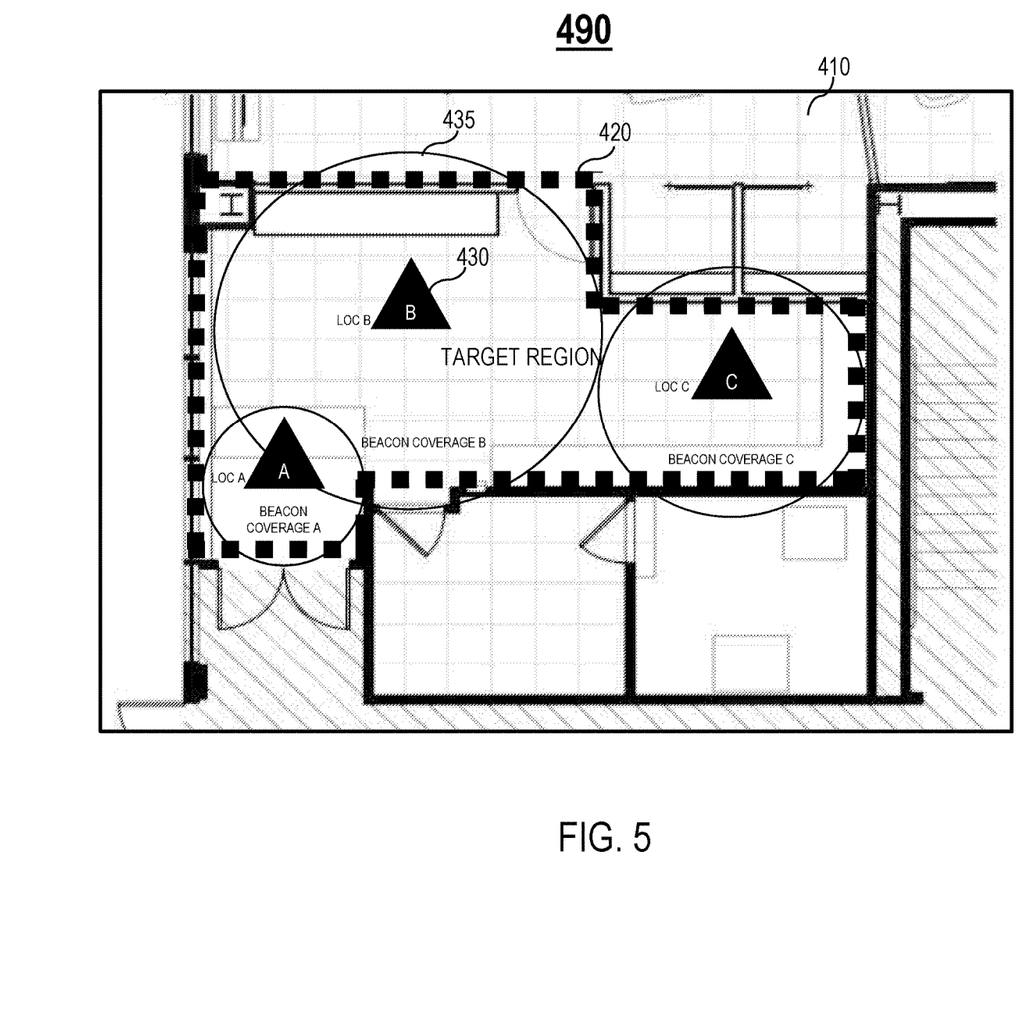
FIG. 5 illustrates an example updated floor plan showing a suggested arrangement/placement of beacons within a target region, in accordance with an embodiment of the invention.

The updated floor plan 490 may be displayed on the device 50 of the user 30. In one embodiment, the beacon placement analysis unit 480 may provide location coordinates for each beacon 430 (e.g., as text output, etc). In one embodiment, the optimal arrangement/placement of beacons provided is added to historical location data for the venue 400 for future reference.

In one embodiment, the optimal arrangement/placement of beacons is further based on object data provided by the user 30. As stated above, the system 200 identifies presence of one or more objects (e.g., furniture items, such as metal shelving, etc.) within the venue 400 that may disrupt/interfere with signals from beacons 430 within the venue 400. If there are one or more objects present that may disrupt/interfere with signals from beacons 430 within the target region 420, the beacon placement analysis unit 480 may suggest placement/location of one or more additional beacons 430 to provide one or more additional areas of beacon coverage. For example, in a retail context, if a retailer provides object data specifying locations of clothing racks within a venue 400, the system 200 understands that the placement of the clothing racks within the venue 400 may disrupt/interfere with signals from beacons 430, and suggests an arrangement/placement of beacons 430 that provide more area of beacon coverage for the target region 420.

The user 30 places/positions beacons 430 in accordance with the optimal arrangement/placement provided. Each beacon 430 is positioned such that the beacons 430 together provide full beacon coverage for the target region 420. In one example, the target region 420 may be fully encompassed inside beacon coverage of the beacons 430. In another example, the beacons 430 may be fully encompassed inside the target region 420 instead. Each beacon 430 transmits a wireless Bluetooth signal to a device 50 to notify the device 50 that it is within the proximity of the beacon 430. A device 50 detects that it has entered or is within proximity of a defined area based on wireless Bluetooth signals received from one or more beacons within the defined area.

FIG. 4 illustrates an example floor plan 410 for a venue 400, in accordance with an embodiment of the invention. A user 30 (e.g., a venue operator) submits, via a device 50, to the system 200 a floor plan 410 for a floor of a venue 400. The user 30 defines an area within the floor plan 410 as a target region 420. In one embodiment, an application 700 on the device 50 may display the floor plan 410 on the device 50, and the user 30 may define the target region 420 by marking/drawing the target region 420 on the floor plan 410 displayed via one or more I/O devices 740 of the device 50.

FIG. 5 illustrates an example updated floor plan 490 showing a suggested arrangement/placement of beacons 430 within a target region 420, in accordance with an embodiment of the invention. For example, the system 200 may determine that a target region 420 requires at least three (3) beacons 430, such as a first beacon 430 ("A"), a second beacon 430 ("B"), and a third beacon 430 ("C"). Beacon A is positioned at a first location ("LOC A") within the target region 420 to provide a first area 435 of beacon coverage ("BEACON COVERAGE A"). Beacon B is positioned at a second location ("LOC B") within the target region 420 to provide a second area 435 of beacon coverage ("BEACON COVERAGE B"). Beacon C is positioned at a third location ("LOC C") within the target region 420 to provide a third area 435 of beacon coverage ("BEACON COVERAGE C"). As shown in FIG. 5, beacons A, B, and C together provide beacon coverage for the target region 420.

Figure 6:
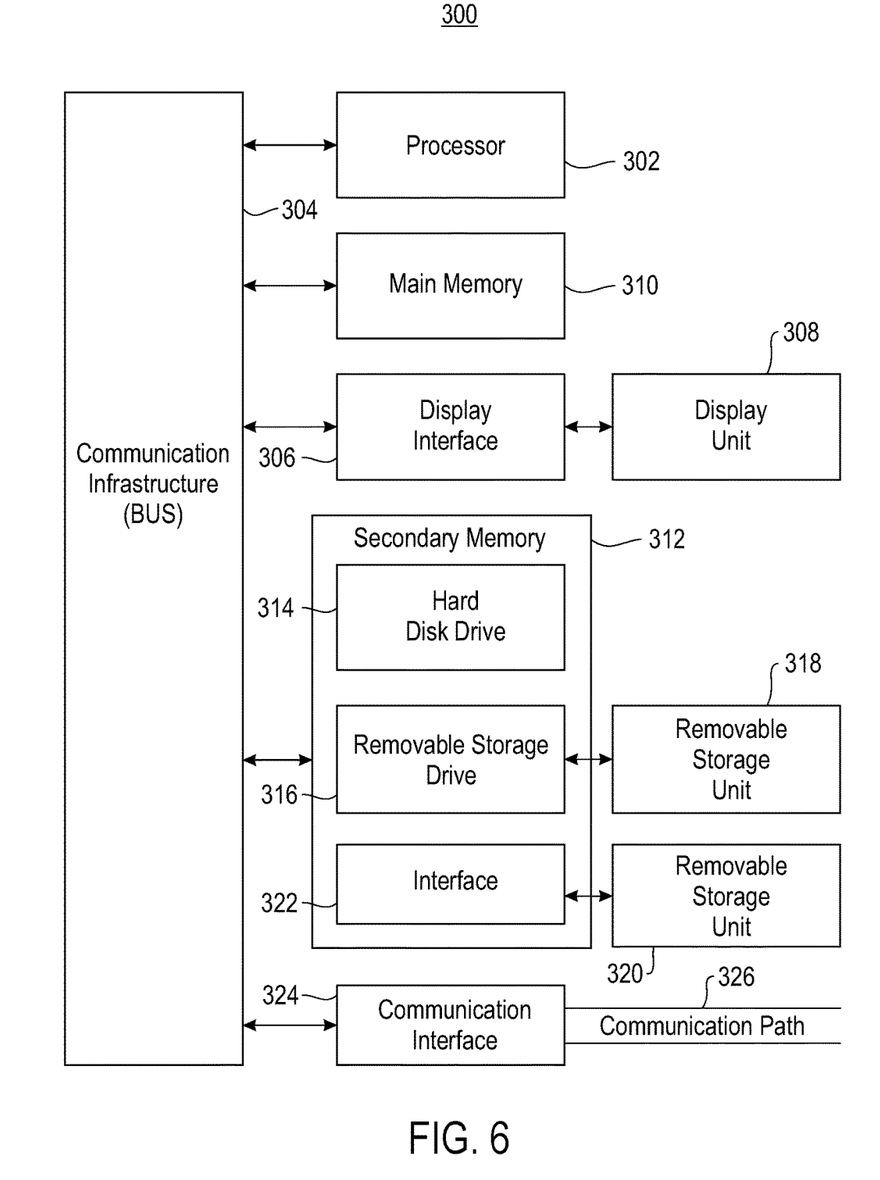
FIG. 6 is a high level block diagram showing an information processing system useful for implementing an embodiment of the present invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, solid-state storage, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for suggesting placement of beacons within a venue, comprising:
   at least one processor; and
   a storage device storing instructions that when executed by the at least one processor causes the at least one processor to perform operations including:
      displaying a floor plan for a venue on an electronic device;
         receiving, from the electronic device, user-specified input identifying a defined area within the floor plan to target, wherein the user-specified input comprises one or more markings drawn on the floor plan displayed by a user utilizing one or more input/output devices of the electronic device;
      determining a first arrangement of beacons for providing beacon coverage for the defined area by:
         determining whether a venue operator for the venue allows for beacons to be placed where there are no walls or shelves;
         determining an optimal power each beacon should use when transmitting a signal;
         determining historical location data for an infrastructure of the defined area;
         determining whether the defined area should be fully encompassed inside beacon coverage of beacons or whether the beacons should be fully encompassed inside the defined area;
            determining a total number of beacons to include within the defined area;
      and
         for each beacon, determining a corresponding location within the defined area to position the beacon at; and
      updating the floor plan displayed on the electronic device to include the first arrangement of beacons;
   wherein the first arrangement of beacons is determined based on historical location data for the venue, user-specified preferences for the venue, signal strength of the beacons, and available power levels for the beacons;
   wherein the historical location data for the venue comprises information indicative of one or more prior arrangements of beacons for one or more defined areas within the floor plan and observed signal performance provided by beacons positioned in accordance with the one or more prior arrangements; and
   wherein the historical location data is updated to include the first arrangement of beacons.

* * * * *